United States Patent [19]

Coblentz

[11] Patent Number: 5,020,832
[45] Date of Patent: Jun. 4, 1991

[54] FLEXIBLE PIPE SADDLE

[75] Inventor: David L. Coblentz, Middletown, Md.

[73] Assignee: General Engineering Company, Fredrick, Md.

[21] Appl. No.: 504,511

[22] Filed: Apr. 4, 1990

[51] Int. Cl.$^5$ .............................................. F16L 5/00
[52] U.S. Cl. ...................................... 285/197; 285/31; 285/252; 285/156
[58] Field of Search ............... 285/126, 156, 180, 197, 285/205, 252

[56] References Cited

U.S. PATENT DOCUMENTS

| | | | |
|---|---|---|---|
| 3,120,965 | 6/1960 | MacDonald | 285/197 X |
| 3,432,188 | 2/1967 | Turner | 285/197 |
| 3,486,774 | 12/1969 | Corey | 285/197 X |
| 3,779,272 | 12/1973 | Dunmire | 285/197 X |
| 4,107,454 | 8/1978 | Jacobsen | 285/197 X |
| 4,428,601 | 1/1984 | Rice et al. | 285/197 |

Primary Examiner—Andrew V. Kundrat
Assistant Examiner—Tim Aberle
Attorney, Agent, or Firm—Sughrue, Mion, Zinn, Macpeak & Seas

[57] ABSTRACT

A flexible pipe saddle molded from a flexible resilient polymer includes a hollow, semi-cylindrical saddle portion adapted to overlie the external surface of a main pipe having a hole therein. The saddle is provided with a radially directed aperture with a radially, inwardly directed, circumferential flange extending about the aperture and extending into the hole in the pipe to locate the saddle relative to the hole in the pipe. The saddle is also provided with a hollow tubular sleeve having a stepped, internal cylindrical surface defining a stepped shoulder for limiting the insertion of a lateral pipe. A hollow tubular bushing of the same material as the saddle is removably disposed in the hollow tubular sleeve and has a radial thickness less than the radial dimension of the stepped shoulder so that a smaller diameter lateral pipe may be used and still abut against the stepped shoulder. A stainless steel skirt overlies the saddle portion and adjustable straps are provided for clamping the saddle portion to the main pipe and for clamping the hollow tubular sleeve to the lateral pipe.

4 Claims, 3 Drawing Sheets

FLEXIBLE PIPE SADDLE

BACKGROUND OF THE INVENTION

The present invention is directed to a flexible pipe saddle and more specifically to a flexible one piece saddle having an integral projecting boss for receiving a branch pipe, wherein the flexible pipe saddle will provide a fluid tight, sealed connection while accommodating different sized pipes and/or surface irregularities.

The principle problem with prior art connectors for connecting a branch pipe to a main pipe is the inability to provide a fluid tight sealed connection in view of variations in pipe diameter and/or surface irregularities. A number of prior art connecting systems utilized a connector member of flexible sealing material which was inserted in a hole drilled in the main pipe with a small flange overlying the surface of the main pipe. The connector member would be secured to the inner surface of the hole by means of an internal wedge or an expansible clamp as disclosed in the U.S. Pat. No. (3,406,988) to Jones and the U.S. Pat. No. (3,958,313) to Rossborough. The connector disclosed in U.S. Pat. No. (3,796,445) to Strott, was secured in the hole in the main pipe by means of sealing material forced into an annular recess between the connector and an outer skirt overlying the surface of the pipe. The system disclosed in U.S. Pat. No. (4,103,940) to Bills utilized a metallic connector with the inner end thereof deformed to provide a saddle and a pilot portion with the connector being brazed to a metallic main pipe. Since the aforementioned connectors are merely inserted into the hole in the main pipe and secured therein by pressure, adhesive means or brazing, the connection between the connector and the main pipe did not provide sufficient strength and stability for the rough usage generally associated with sewer pipes that are buried in the ground.

In order to provide a stronger, more stable connection between the connector and the main pipe a number of prior art systems provided rigid saddle members having a projecting, hollow, tubular boss portion in alignment with a hole in the main pipe and connecting means extending completely about the main pipe for anchoring the saddle in the proper position relative to the hole. Since the saddles were rigid and unyielding, it was necessary to provide a number of different size saddles to accommodate different size pipes or to provide a plurality of adapters for mating a saddle to different sized pipes. An example of a plurality of adapters is disclosed in U.S. Pat. No. (3,331,622) to Bagnulo. Furthermore, since the saddles were rigid and unyielding, it was always necessary to utilize a separate sealing member between the saddle and the main pipe to provide a fluid tight seal. The patent to Bagnulo utilizes such a separate sealing member, as do the Fowler U.S. Pat. No. (3,663,042), Henry U.S. Pat. No. (3,825,286), Acda U.S. Pat. No. (3,918,748), Blakely U.S. Pat. No. (3,999,785) and Acda U.S. Pat. No. (4,018,464).

In order to accommodate a saddle to different size mains, the Burnett U.S. Pat. No. (4,494,780) discloses a saddle formed of an elastomeric material having a hollow, tubular extension for receiving a lateral. A hollow, cylindrical casting surrounds the hollow, cylindrical projection and is connected to an adjustable strap at either side which extends about the main pipe, so that upon tightening of the strap, the casting will press down on the elastomeric saddle to deform the saddle into engagement with different size mains. Thus, distortion will vary depending upon the size of the main with significant bulging of the saddle. Such stresses frequently lead to failure of the saddle, thereby destroying the integrity of the fluid tight connection. Furthermore, for different size laterals, it is necessary to utilize separate saddles having hollow, tubular extensions of different sizes. The elastomeric saddle merely abuts against the surface of the main surrounding the hole cut in the main and there are no means provided for specifically locating the saddle relative to the hole prior to the tensioning of the strap to ensure that the saddle engages the main along a line which is spaced substantially equidistant from the periphery of the hole. In any event such spacing provides an impediment to the flow of fluids from the lateral into the main. The Jakobsen U.S. Pat. No. (4,107,454) discloses use of a resilient saddle of an elastomer or rubber material secured to the main by means of adjustable straps extending completely about the main and the saddle. However, no means are provided for locating the saddle relative to the hole and instead of a radially projecting hollow, tubular member for receiving a lateral, the saddle is provided with an axially extending aperture for the reception of a hose coupling to facilitate the introduction of a pressurized gas into the main conduit.

The use of plastics in the construction of saddles for connecting a lateral pipe to a main pipe is old and well known in the art as evidenced by Turner U.S. Pat. No. (3,432,188) and Smith U.S. Pat. No. (3,891,247). However, the plastic material disclosed in each of these patents is relatively rigid and a separate sealing ring is required in Turner while a complicated series of passages and recesses are required in the saddle of Smith to allow the fluid pressure within the pipes to create a sealing of the saddle to the main pipe.

SUMMARY OF THE INVENTION

The present invention provides a new and improved flexible pipe saddle designed to accommodate different size diameter lateral pipes while providing a flexible connector to different diameter main pipes without the use of separate sealing means.

The present invention provides a new and improved flexible pipe saddle comprised of a hollow, semi-cylindrical saddle portion of flexible, resilient material having a radially directed aperture with a radially inwardly directed circumferential flange extending about the aperture for locating the aperture in the saddle in alignment with a corresponding aperture in a main pipe and with a radially outwardly directed hollow, tubular sleeve surrounding said aperture for receiving a lateral pipe, and a flexible metallic skirt substantially overlying the entire outer surface of said saddle portion with adjustable strap means secured thereto for extending about a main pipe to clamp said saddle to said main pipe. The hollow, tubular sleeve is provided with a first internal diameter portion having the same diameter as the internal surface of the flange to provide a smooth, continuous, inner cylindrical surface extending through said saddle portion and a second portion having a larger internal diameter to define a stop shoulder for limiting the insertion of a lateral pipe. A hollow, tubular bushing of the same material as the saddle is provided for insertion into the hollow, tubular sleeve against the shoulder to reduce the internal diameter of the lateral pipe receiving portion of the sleeve while still leaving a portion of the shoulder exposed to limit the insertion of a smaller diameter, lateral pipe.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
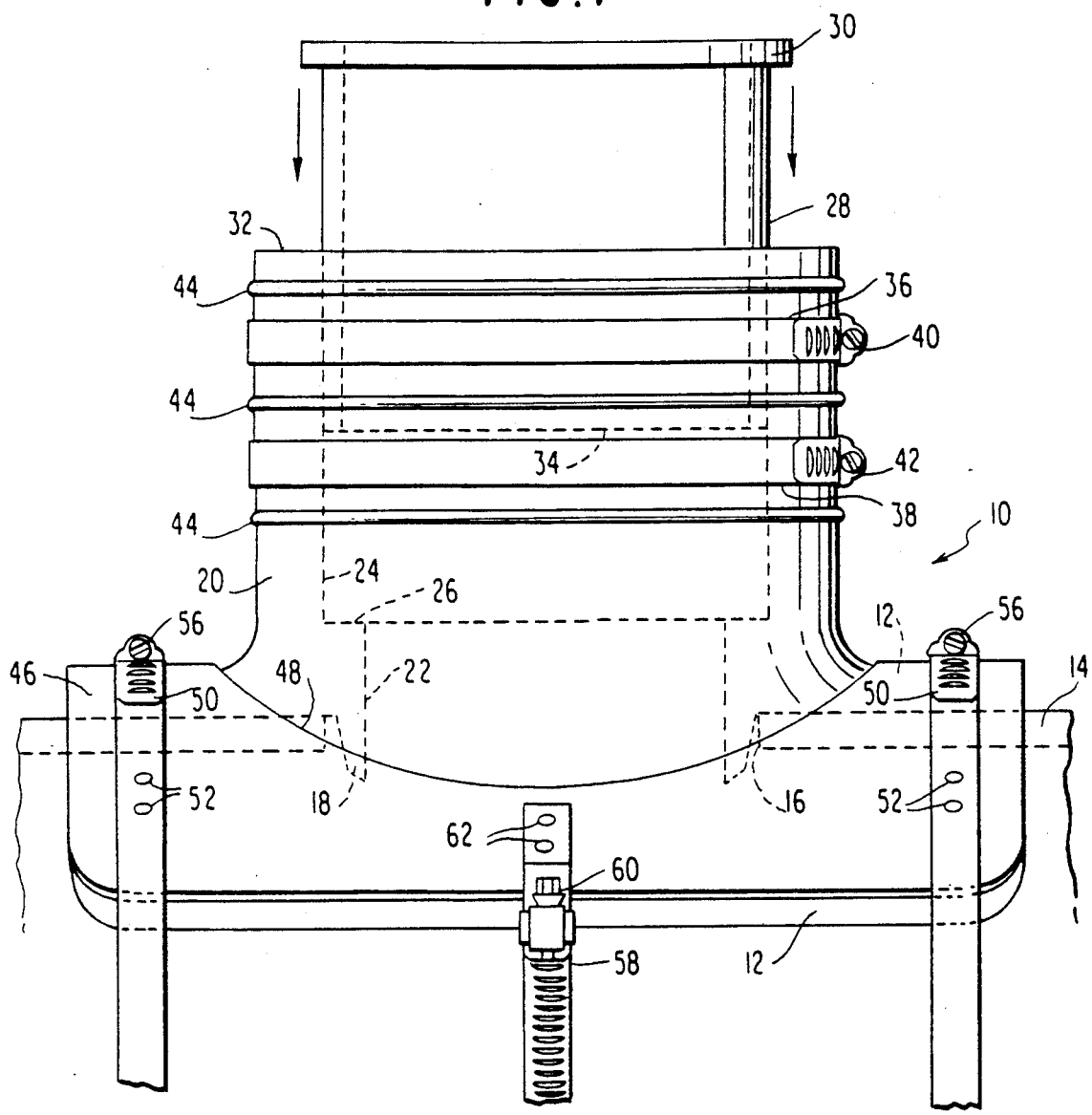
FIG. 1 is a front elevational view of the flexible pipe saddle according to the present invention secured in operative position on a main pipe with a bushing partially inserted in the lateral pipe connector.
Figure 4:
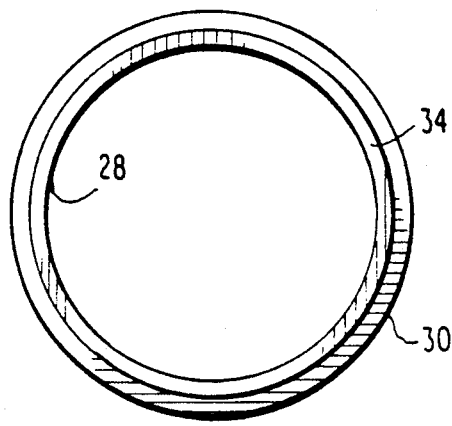
FIG. 4 is a bottom plan view of the flexible bushing shown in FIG. 1.
Figure 2:
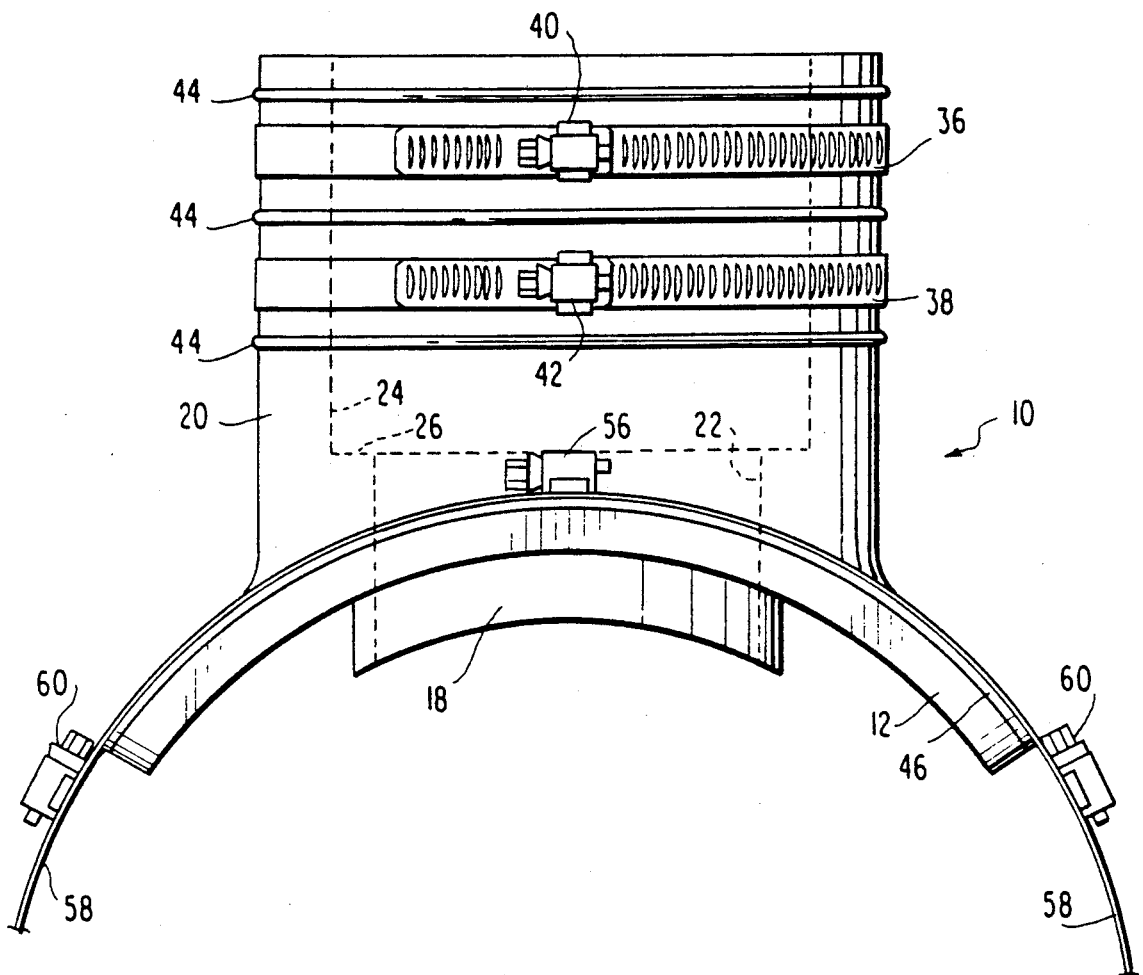
FIG. 2 is a side elevational view of the flexible pipe saddle assembly as shown in FIG. 1 without the bushing.
Figure 5:
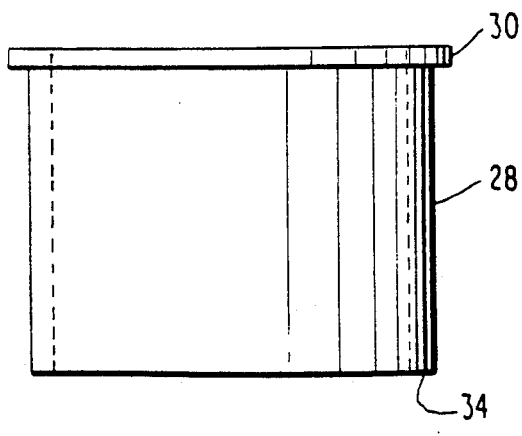
FIG. 5 is a side view of the bushing shown in FIG. 4.
Figure 3:
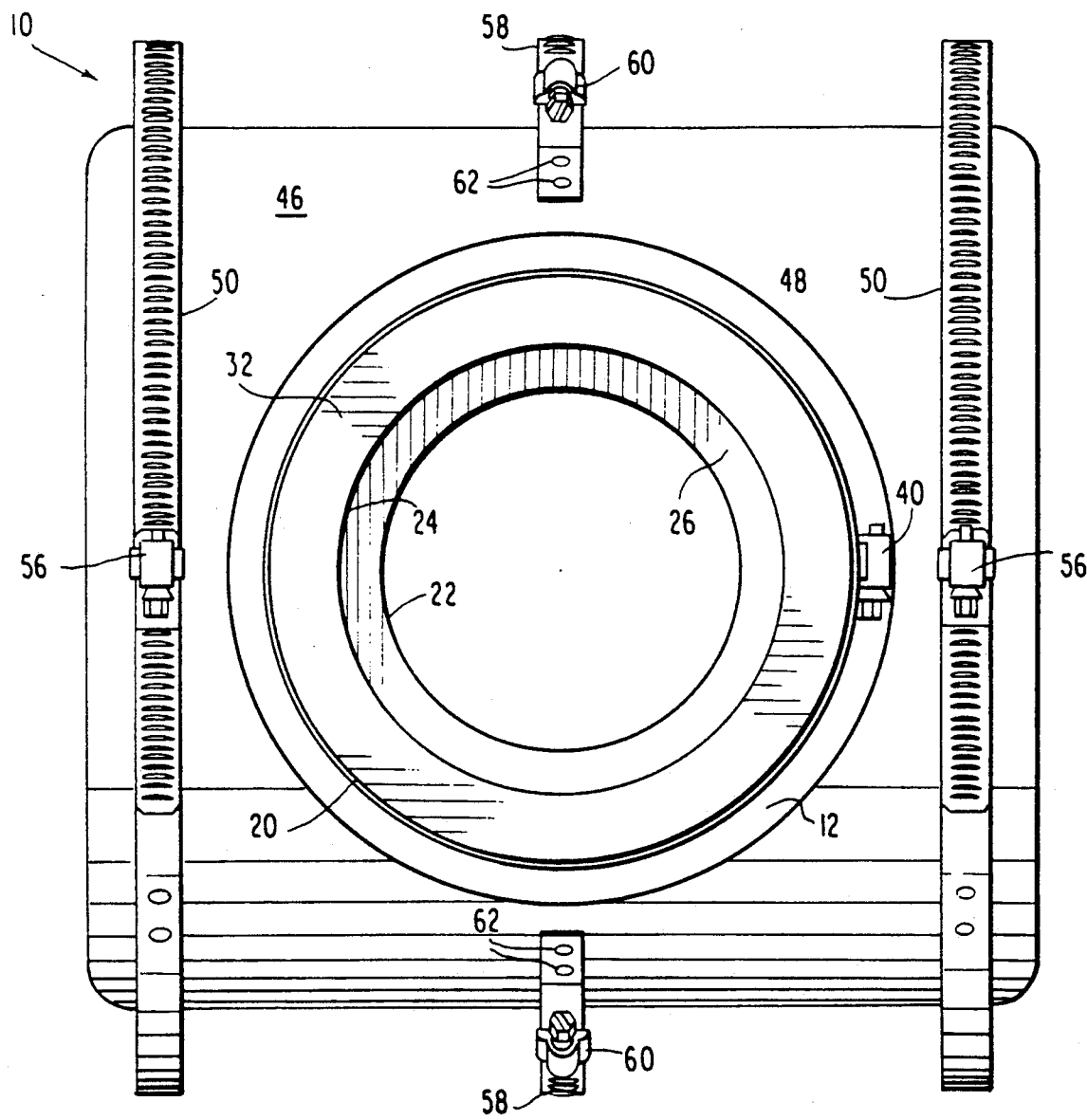
FIG. 3 is a top plan view of the flexible pipe saddle assembly as shown in FIG. 2.

The flexible pipe saddle 10 according to the present invention is comprised of a one piece saddle molded from flexible, resilient polymer material, such as polyurethane or the like. The saddle 10 includes a semi-cylindrical skirt portion 12 which is adapted to be placed over and conformed to the cylindrical outer surface of a main pipe 14 such as a sewer pipe having a circular hole 16 cut or otherwise formed therein. A radially, inwardly directed, cylindrical flange 18 which is of integral, one piece construction with the saddle portion 12, extends into the hole 16 as shown in FIG. 1 to properly locate the saddle 10 on the pipe 14 and prevent longitudinal or circumferential movement of the saddle relative to the pipe subsequent to installation and securement thereon. A radially, outwardly directed, hollow, tubular sleeve 20 is also formed of integral, one piece construction with the saddle portion 12 and is adapted to receive a branch pipe or lateral pipe which will communicate with the interior of the main pipe 14 through the hole 16.

The hollow tubular sleeve 20 is provided with a stepped, internal, cylindrical surface. A first portion of the internal surface 22 is provided with an internal diameter equal to the internal diameter of the flange 18, so that a smooth cylindrical surface extends through the saddle portion 12 and the hole 16 in the main pipe 14. A second portion 24 of the internal surface is provided with a larger internal diameter than the internal diameter of the first portion 22, thereby defining a stepped shoulder 26. The difference between the internal diameter of the first portion 22 and the internal diameter of the second portion 24 is such that the radial dimension of the shoulder 26 is substantially equal to the radial thickness of a lateral pipe adapted to be inserted into the hollow tubular sleeve 20. Thus, the lateral pipe (not shown) will abut against the shoulder 26, thereby preventing intrusion of the end of the lateral pipe into the main pipe 14 where it might interfere with the flow of fluids through the main pipe. The inner surface of the lateral pipe will have a diameter substantially equal to the internal diameter of the first portion 22 so that a substantially smooth, inner cylindrical surface will be provided for the uninterrupted flow of fluids through the lateral pipe, the first portion 22 of the sleeve and the flange 18.

In order to accommodate different size lateral pipes a hollow tubular bushing 28 of the same material as the saddle, is provided for insertion into the hollow tubular sleeve 20. An outwardly projecting annular flange 30 is provided at the outermost end of the bushing 28 and is adapted to abut against the upper surface 32 of the hollow tubular sleeve 20 to limit the insertion of the bushing 28 and to facilitate its removal from the sleeve 20. The length of the bushing 28 is such that the innermost end 34 is adapted to abut or terminate in close proximity to the shoulder 26. The radial thickness of the bushing 28 is approximately equal to one-half the radial dimension of the shoulder 26 so that upon insertion of a lateral pipe into the sleeve 20 with the bushing 28 therein, the pipe is still capable of abutting against the shoulder 26 to limit the insertion of the pipe into the saddle member. The lateral pipe used with the bushing 28 will obviously have a smaller, outer diameter than the lateral pipe used without the bushing 28 and the internal diameter of a pipe used with the bushing 28 will have an internal diameter equal to or less than the internal diameter of the first portion 22 of the sleeve 20. Thus, there will not be any portion of the shoulder 26 exposed to impede the flow of fluids from a lateral pipe into the main pipe 14.

Once the pipe is inserted into the hollow tubular sleeve 20, with or without the bushing 28, a pair of adjustable circumferential straps 36 and 38 having adjustment means 40 and 42, respectively, are applied about the external circumference of the sleeve 20 and tightened to clamp the flexible resilient material of the sleeve 20 and the bushing 28, if present, against the outer surface of the lateral pipe to provide a fluid-tight sealed connection. The sleeve 20 is molded with a plurality of integral, circumferential projection beads 44 between which the adjustable straps 36 and 38 are located to prevent longitudinal movement of the straps along the sleeve 20 beyond the limits defined by the beads 44. The straps 36 and 38 in the respective adjustment assemblies 40 and 42 are conventional in the art and need not be described in detail.

In order to securely clamp the flexible pipe saddle 10 to the external surface of the pipe 14, a flexible, metallic skirt 46, preferably of stainless steel material, substantially overlies the entire external surface of the saddle portion 12 and is provided with a central cut-out portion 48 to accommodate the radially projecting sleeve 20. A pair of adjustable strap assemblies 50, which are substantially identical to the adjustable strap assemblies 36, 40, extend about opposite ends of the stainless steel skirt 46 on opposite sides of the sleeve 20. The strap assemblies 50 are secured at one end to the external surface of the skirt 46 by means of spot welds 52 or any other suitable securement means. The strap assemblies 50 then extend completely about the pipe 14 and the skirt 46 for adjustable tightening by the adjustable connectors 56. In order to provide uniform clamping of the saddle portion 12 to the pipe 14, an additional strap assembly 58 is provided wherein two adjustable connector portions 60 are secured to opposite sides of the skirt 46 by means of spot welds 62 or any other suitable means. The adjustable connectors 60 engage opposite ends of the flexible strap 58 which extends about the pipe 14 for adjustably clamping the strap 58 against the pipe 14. Thus, upon proper tightening of the three strap assemblies, the skirt 46 will be uniformly pressed against the outer surface of the saddle portion 12, to press the saddle portion 12 in a fluid-tight manner against the external surface of the pipe 14 about the hole 16 formed in the pipe 14.

The specific materials of the flexible pipe saddle 10 and the flexible skirt 46 may vary while still accomplishing the purpose of the present invention which is the provision of a flexible pipe saddle adapted to accommodate different diameter main pipes as well as different diameter lateral pipes and provide a fluid-tight sealed connection therebetween without the use of separate sealing members. As mentioned previously, the various adjustable strap assemblies are conventional in the art and other types of adjustable strap assemblies could readily be utilized.

While the invention has been particularly shown and described with reference to preferred embodiments thereof, it will be understood by those in the art that the foregoing and other changes in form and details may be made therein without departing from the spirit and scope of the invention.

What is claimed is:

1. A flexible pipe saddle assembly for connecting lateral pipe to a main pipe comprising:
    a hollow, semi-cylindrical saddle portion of flexible, resilient material having a radially directed aperture,
    a radially, inwardly directed circumferential flange made integral with said saddle, extending about said aperture, and extending into a corresponding aperture in the main pipe,
    a radially, outwardly directed hollow tubular sleeve made integral with said saddle and surrounding said aperture for receiving a lateral pipe,
    a flexible, metallic skirt substantially completely overlying said saddle portion, and
    adjustable strap means secured to said skirt and extending about the main pipe to clamp said saddle assembly to said main pipe in fluid tight sealing engagement with the main pipe,
    said hollow tubular sleeve having a first internal diameter portion continuous with an internal surface of said flange to provide a smooth continuous inner cylindrical surface extending through said saddle portion and a second portion having a larger, internal diameter to define a stepped shoulder between said first and second portions for limiting the insertion of the lateral pipe.

2. A flexible pipe saddle assembly as set forth in claim 1, wherein said stepped shoulder has a radial dimension substantially equal to the radial thickness of a lateral hollow pipe inserted in said hollow tubular sleeve and further comprising a hollow tubular bushing removably disposed in said hollow tubular sleeve in abutment with said shoulder and having a radial thickness less than the radial dimension of said stepped shoulder, whereby a lateral pipe having an external diameter substantially equal to an internal diameter of said bushing, will abut said stepped shoulder to limit insertion of the lateral pipe.

3. A flexible pipe saddle assembly as set forth in claim 1, further comprising a plurality of additional adjustable strap means surrounding said hollow tubular sleeve for clamping said hollow tubular sleeve into fluid-tight sealing engagement with a lateral pipe.

4. A flexible pipe saddle assembly as set forth in claim 1, wherein said saddle portion and said sleeve are of one piece polyurethane.

* * * * *